United States Patent
Shimoda et al.

(10) Patent No.: US 9,969,875 B2
(45) Date of Patent: May 15, 2018

(54) POLYACETAL RESIN COMPOSITION AND SLIDING MEMBER

(71) Applicant: Polyplastics Co., Ltd., Tokyo (JP)

(72) Inventors: Akihide Shimoda, Fuji (JP); Hirokazu Katsuchi, Fuji (JP)

(73) Assignee: POLYPLASTICS CO., LTD., Tokyo (JP)

( * ) Notice: Subject to any disclaimer, the term of this patent is extended or adjusted under 35 U.S.C. 154(b) by 0 days. days.

(21) Appl. No.: 15/548,994

(22) PCT Filed: Nov. 30, 2015

(86) PCT No.: PCT/JP2015/083615
§ 371 (c)(1),
(2) Date: Aug. 4, 2017

(87) PCT Pub. No.: WO2016/151946
PCT Pub. Date: Sep. 29, 2016

(65) Prior Publication Data
US 2018/0037732 A1    Feb. 8, 2018

(30) Foreign Application Priority Data
Mar. 20, 2015 (JP) .................. 2015-057708

(51) Int. Cl.
C08K 3/26 (2006.01)
C08L 59/00 (2006.01)
C08K 5/101 (2006.01)
C08L 83/04 (2006.01)
C08K 5/16 (2006.01)
C08K 7/08 (2006.01)
C08L 51/04 (2006.01)
C08K 5/13 (2006.01)

(52) U.S. Cl.
CPC .............. C08L 59/00 (2013.01); C08K 3/26 (2013.01); C08K 5/101 (2013.01); C08K 5/13 (2013.01); C08K 5/16 (2013.01); C08K 7/08 (2013.01); C08L 51/04 (2013.01); C08L 83/04 (2013.01)

(58) Field of Classification Search
CPC ....................................... C08L 59/00
USPC ....................................... 525/398
See application file for complete search history.

(56) References Cited

U.S. PATENT DOCUMENTS

| | | | |
|---|---|---|---|
| 4,647,609 | A | 3/1987 | O'Brien |
| 6,284,828 | B1 | 9/2001 | Takayama |
| 8,633,264 | B2 | 1/2014 | Hase |
| 2004/0242747 | A1 | 12/2004 | Nandi |
| 2006/0063863 | A1 | 3/2006 | Sunaga et al. |
| 2010/0280156 | A1 | 11/2010 | Hase |

FOREIGN PATENT DOCUMENTS

| | | |
|---|---|---|
| CN | 102585432 A | 7/2012 |
| EP | 0420564 A2 | 4/1991 |
| EP | 0420564 B1 | 10/1994 |
| JP | H03-111446 A | 9/1998 |
| JP | H10-237268 A | 9/1998 |
| JP | 2007-070375 A | 3/2007 |
| JP | 2008-214490 A | 9/2008 |
| JP | 2009-155418 A | 7/2009 |
| JP | 2009-286874 A | 12/2009 |
| JP | 2012-136656 A | 7/2012 |
| JP | 2012-153899 A | 8/2012 |
| JP | 2013-112727 A | 6/2013 |

OTHER PUBLICATIONS

Office Action issued in Korean Patent Application No. 10-2017-7023132, dated Sep. 20, 2017.
Office Action in Chinese Patent Application No. 201580075634.6, dated Feb. 11, 2018.
Extended European search report issued in European Patent Application No. 15886498.3, dated Feb. 23, 2018.

Primary Examiner — Terressa Boykin
(74) Attorney, Agent, or Firm — Knobbe Martens Olson & Bear LLP

(57) ABSTRACT

A polyacetal resin composition which not only is highly inhibited from making creaking sounds but also has satisfactory performances with respect to other properties. The polyacetal resin composition includes 100 parts by weight of a polyacetal resin, 0.01-1 part by weight of a hindered phenolic antioxidant, 0.01-1 part by weight of a nitrogenous compound, 0.1-1 part by weight of a graft copolymer, 0.1-1 part by weight of a fatty acid ester, 0.5-5 parts by weight of a silicone oil, and 0.1-1 part by weight of calcium carbonate. The nitrogenous compound may be an aminotriazine compound, the graft copolymer includes an olefin-based polymer as the main chain and a vinyl-based polymer as side chains, the fatty acid ester includes a C12-32 fatty acid and a C2-30 mono- or polyhydric alcohol, and the calcium carbonate has an average particle diameter of 1 μm or smaller.

4 Claims, No Drawings

POLYACETAL RESIN COMPOSITION AND SLIDING MEMBER

RELATED APPLICATIONS

This application is the U.S. National Phase under 35 U.S.C. § 371 of International Application PCT/JP2015/083615, filed Nov. 30, 2015, designating the U.S., and published in Japanese as WO 2016/151946 on Sep. 29, 2016, which claims priority to Japanese Patent Application No. 2015-057708, filed Mar. 20, 2015, the entire contents of which are incorporated herein by reference.

TECHNICAL FIELD

The present invention relates to a polyacetal resin composition and to a sliding member.

BACKGROUND ART

Polyacetal resin (also referred to as polyoxymethylene resin, and abbreviated as POM resin) has well balanced mechanical qualities, and is excellent in abrasion resistance•abrasion characteristics, chemical resistance, thermal resistance, electrical characteristics, and the like, and is therefore widely utilized in the fields of automobiles, electric•electronic articles, and the like.

However, the demanded characteristics in these fields are gradually becoming more sophisticated, and as one example thereof, there is a strong demand for improving the basic sliding characteristics represented by the coefficient of friction and abrasion amount, along with in particular, suppressing the generation of creaking sounds when sliding, while maintaining the excellent surface smoothness of the polyacetal resin.

In order to respond to such requirements, methods of adding fluororesins or polyolefin resins to a polyacetal resin are known. However, fluororesins and polyolefin resins have poor compatibility with polyacetal resins. Therefore, these resins may separate from the polyacetal resin and cause detachment at the surface of a molded article, or generate deposits at a die when molding a molded article.

Further, a method of adding lubricating oils such as fatty acids, fatty acid esters, silicone oils, various mineral oils, and the like to a polyacetal resin is known. However, when molding a molded article, the polyacetal resin and the lubricating oil and the like may separate, whereby oozing out of the lubricating oil and the like may readily occur, and the oozed lubricating oil and the like may impair the extrusion processing properties and the molding processing properties. Further, if the lubricating oil and the like oozes out to the surface of the molded article, this may impair the appearance of the molded article.

In order to solve these problems, a polyacetal resin composition has been proposed wherein 0.5 to 40 parts by weight of a graft copolymer (B) wherein an olefin-based polymer (a) and one or two or more of a vinyl-based polymer or an ether-based polymer (b) are chemically bonded with a branched or crosslinked structure; 0.1 to 20 parts by weight of a lubricant (C); and 0.5 to 30 parts by weight of an inorganic powder (D) having an average particle diameter of 50 µm or less and further having a ratio of particles with a diameter of 100 µm or less of 95% or more; are added to and blended with 100 parts by weight of a polyacetal resin (A) (for example, refer to Patent Document 1).

Further, the selective combined use and blending of a hindered phenolic antioxidant; a specified nitrogenous compound; a specified graft copolymer; and a fatty acid ester; with a specified polyacetal resin has been proposed (for example, refer to Patent Document 2).

Patent Document 1: Japanese Unexamined Patent Application, Publication No. H03-111446

Patent Document 2: Japanese Unexamined Patent Application, Publication No. 2013-112727

DISCLOSURE OF THE INVENTION

Problems to be Solved by the Invention

However, even the polyacetal resin compositions disclosed in Patent Documents 1 and 2 have room for further improvement relating to creaking sounds.

The present invention has the objective of providing a polyacetal resin composition having good performance not only for creaking sounds, but also for various other characteristics (tensile strength, toughness, flexural strength, rigidity, friction•abrasion characteristics, surface detachment, and the like).

Means for Solving the Problems

The inventors of the present invention, as a result of diligent study in order to achieve the above mentioned objective, discovered that the above objective can be achieved by requiring the combined use of two specified types of lubricants as a lubricant, specifically, a fatty acid ester and a silicone oil, and thus achieved the present invention. More specifically, the present invention provides the following.

The first aspect of the present invention is a polyacetal resin composition comprising 100 parts by weight of a polyacetal resin (A), 0.01 parts by weight to 1 part by weight of a hindered phenolic antioxidant (B), 0.01 parts by weight to 1 part by weight of a nitrogenous compound (C), 0.1 part by weight to 1 part by weight of a graft copolymer (D), 0.1 part by weight to 1 part by weight of a fatty acid ester (E), 0.5 parts by weight to 5 parts by weight of a silicone oil (F), and 0.1 parts by weight to 1 part by weight of calcium carbonate (G), wherein the nitrogenous compound (C) is at least one selected from the group consisting of an aminotriazine compound, a guanamine compound, a hydrazide compound, and a polyamide compound, the graft copolymer (D) has an olefin-based polymer (d1) as a main chain, and comprises a vinyl-based polymer (d2) as a side chain, the fatty acid ester (E) is constituted from a fatty acid with a carbon number of 12 to 32, and a monohydric or polyhydric alcohol with a carbon number of 2 to 30, and the calcium carbonate (G) has an average particle diameter of 1 µm or less.

The second aspect of the present invention is a polyacetal resin composition according to the first aspect, wherein the graft copolymer (D) comprises an acrylonitrile-styrene-graft-polyethylene resin.

The third aspect of the present invention is a polyacetal resin composition according to the first or second aspect, wherein the silicone oil (F) has a kinematic viscosity at 25° C. of 50,000 cSt (500 cm$^2$/s) or more.

The fourth aspect of the present invention is a sliding member constituted from a resin molded article comprising the polyacetal resin composition according to the first or second aspect of the present invention.

Effects of the Invention

According to the present invention, it is possible to provide a polyacetal resin composition which has good performance, not only for creaking sounds, but also for various other characteristics (tensile strength, toughness, flexural strength, rigidity, friction•abrasion characteristics, surface detachment, and the like).

PREFERRED MODE FOR CARRYING OUT THE INVENTION

Below, specific embodiments of the present invention are explained in detail, but the present invention is not in any way limited by the below embodiments, and within the scope of the objective of the present invention, it may be implemented with the addition of suitable modifications.

Polyacetal Resin Composition

The polyacetal resin composition according to the present invention comprises a polyacetal resin (A), a hindered phenolic antioxidant (B), a nitrogenous compound (C), a graft copolymer (D), a fatty acid ester (E), a silicone oil (F), calcium carbonate (G)

Polyacetal Resin (A)

As the polyacetal resin (A), either of a polyacetal homopolymer and a polyacetal copolymer where the majority of the main chain is made of an oxymethylene chain may be used. Further, as the base resin, one where a polyacetal is modified by crosslinking or graft copolymerization by a publicly known method may be used, and there is no restriction on the degree of polymerization or the like provided that it is moldable.

Hindered Phenolic Antioxidant (B)

The hindered phenolic antioxidant (B) which may be used in the present invention is not particularly limited, and for example, monocyclic phenolic compounds (for example, 2,6-di-t-butyl-p-cresol, and the like), polycyclic hindered phenolic compounds connected by a group comprising a hydrocarbon group or a sulfur atom (for example, 2,2'-methylenebis(4-methyl-6-t-butylphenol), 4,4'-methylenebis(2,6-di-t-butylphenol), 1,1,3-tris(2-methyl-4-hydroxy-5-t-butylphenyl)butane, 4,4'-butylidinebis(3-methyl-6-t-butylphenol), 1,3,5-trimethyl-2,4,6-tris(3,5-di-t-butyl-4-hydroxybenzyl)benzene, 4,4'-thiobis(3-methyl-6-t-butylphenol), and the like), hindered phenol compounds having an ester group or amide group (for example, n-octadecyl-3-(4'-hydroxy-3',5'-di-t-butylphenyl)propionate, n-octadecyl-2-(4'-hydroxy-3',5'-di-t-buthylphenyl)propionate, 1,6-hexanediol-bis[3-(3,5-di-t-butyl-4-hydroxyphenyl)propionate], triethyleneglycol-bis[3-(3-t-butyl-5-methyl-4-hydroxyphenyl)propionate], pentaerythritoltetrakis[3-(3-,5-di-t-butyl-4-hydroxyphenyl)propionate], 3,9-bis{2-[3-(3-t-butyl-4-hydroxy-5-methylphenyl)propionyloxy]-1,1-dimethylethyl}-2,4,8,10-tetraoxaspiro[5.5]undecane, 2-t-butyl-6-(3'-t-butyl-5'-methyl-2'-hydroxybenzyl)-4-methylphenylacrylate, 2-[1-(2-hydroxy-3,5-di-t-pentylphenyl)ethyl]-4,6-di-t-pentylphenylacrylate, di-n-octadecyl-3,5-di-t-butyl-4-hydroxybenzylphosphonate, N,N'-hexamethylenebis(3,5-di-t-butyl-4-hydroxy-dihydrocinnamide), N,N'-ethylenebis[3-(3,5-di-t-butyl-4-hydroxyphenyl)propionamide], N,N'-tetramethylenebis[3-(3,5-di-t-butyl-4-hydroxyphenyl)propionamide], N,N'-hexamethlyenebis[3-(3,5-di-t-butyl-4-hydroxyphenyl)propionamide], N,N'-ethylenebis[3-(3-t-butyl-5-methyl-4-hydroxyphenyl)propionamide], N,N'-hexamethylenebis[3-(3-t-butyl-5-methyl-4-hydroxyphenyl)propionamide], N,N'-bis[3-(3,5-di-t-butyl-4-hydroxyphenyl)propionyl]hydrazine, N,N'-bis[3-(3-t-butyl-5-methyl-4-hydroxyphenyl)propionyl]hydrazine, 1,3,5-tris(3,5-di-t-butyl-4-hydroxybenzyl)isocyanurate, 1,3,5-tris(4-t-butyl-3-hydroxy-2,6-dimethylbenzyl)isocyanurate, and the like may be mentioned.

In the present invention, at least one, or two or more selected from these antioxidants may be used.

In the present invention, the content of the hindered phenolic antioxidant (B) is 0.01 parts by weight to 1 part by weight with respect to 100 parts by weight of the polyacetal resin (A), preferably 0.02 parts by weight to 0.5 parts by weight. If the blended amount of the antioxidant (B) is too small, the antioxidant characteristics may be insufficient, and the stability of the polyacetal resin (A) with respect to short term oxidation degradation at high temperatures during molding processing or the like, or with respect to oxidation degradation under long term use at normal temperatures may be insufficient, and therefore is unfavorable. Moreover, insufficient stability of the polyacetal resin (A) component gives rise to deterioration, and this also exerts an unfavorable influence on the sliding characteristics. On the other hand, if the blended amount of the (B) antioxidant is excessive, this is not only uneconomical, but may also causes impairment of the mechanical properties of the obtained resin composition.

Nitrogenous Compound (C)

The nitrogenous compound (C) in the present invention is at least one basic nitrogenous compound selected from the group consisting of aminotriazine compounds, guanamine compounds, hydrazide compounds, and polyamide compounds.

As the aminotriazine compound, melamine and its derivatives (melamine, melamine condensate (melam, melem, melon) and the like], guanamine or its derivatives, and aminotriazine resin [co-condensate resin of melamine (melamine-formaldehyde resin, phenol-melamine resin, melamine-phenol-formaldehyde resin, benzoguanamine-melamine resin, aromatic polyamine-melamine resin, and the like), co-condensate resins of guanamine, and the like], and the like may be mentioned.

As the guanamine compound, aliphatic guanamine compounds (monoguanamines, alkylene bisguanamines and the like), alicyclic guanamine-based compounds (monoguanamines and the like), aromatic guanamine-based compounds [monoguanamines (benzoguanamine and its functional group substitution products, and the like), α- or β-naphthoguanamine and their functional group substitution products, polyguanamines, aralkyl or aralkylene guanamines, and the like], heteroatom-containing guanamine-based compounds [acetal group-containing guanamines, tetraoxospiro ring-containing guanamines (CTU-guanamine, CMTU-guanamine, and the like), isocyanuryl ring-containing guanamines, imidazol ring-containing guanamines, and the like], and the like may be mentioned. Further, compounds where an alkoxymethyl group substitutes an amino group of the above mentioned melamines, melamine derivatives, and guanamine-based compounds, and the like are also included.

As the hydrazide compound, aliphatic carboxylic acid hydrazide-based compounds (stearic acid hydrazide, 12-hydroxystearic acid hydrazide, sebacic acid dihydrazide, dodecanedioic acid dihydrazide, eicosanedioic acid dihydrazide, and the like), alicyclic carboxylic acid hydrazide-based compounds (1,3-bis(hydrazinocarbonoethyl)-5-isopropyl hydantoin and the like), aromatic carboxylic acid hydrazide-based compounds (4-hydroxy-3,5-di-t-butylphenyl benzoic acid hydrazide, 1-naphthoic acid hydrazide, 2-naphthoic acid hydrazide, isophthalic acid dihydrazide, 2,6-naphthalenedicarboxylic acid dihydrazide, and the like), heteroatom-containing carboxylic acid hydrazide-based compounds, polymer type carboxylic acid hydrazide-based compounds, and the like may be mentioned.

As the polyamide, polyamides derived from diamines and dicarboxylic acids; polyamides obtained from aminocarboxylic acids, if necessary co-used with diamines and/or dicarboxylic acids; polyamides derived from lactams, if necessary co-used with diamines and/or dicarboxylic acids, are included. Further, copolymer polyamides formed by two or more differing polyamide forming components are also included.

As examples of specific polyamides, aliphatic polyamides such as polyamide 3, polyamide 4, polyamide 46, polyamide 6, polyamide 66, polyamide 610, polyamide 612, polyamide 11, polyamide 12 and the like, polyamides obtained from an aromatic dicarboxylic acid (for example, terephthalic acid and/or isophthalic acid) and aliphatic diamines (for example, hexamethylene diamine), polyamides obtained from aliphatic dicarboxylic acids (for example, adipic acid) and aromatic diamines (for example, meta xylylene diamine), polyamides obtained from aromatic and aliphatic dicarboxylic acids (for example, terephthalic acid and adipic acid) and aliphatic diamines (for example, hexamethylene diamine) and their polymers and the like may be mentioned. Further, a polyamide-based block copolymer wherein a polyamide hard segment and another soft segment such as a polyether component and the like are joined may also be used.

In the present invention, a nitrogenous compound (C) selected from an aminotriazine compound, a guanamine compound, a hydrazide compound, and a polyamide may be used individually or in combinations of two or more. Particularly preferable nitrogenous compounds (C) are melamine, benzoguanamine, CTU-guanamine, and sebacic acid dihydrazide.

In the present invention, the blended amount of the nitrogenous compound (C) is 0.01 parts by weight to 1 part by weight with respect to 100 parts by weight of the polyacetal resin (A). If the blended amount of the nitrogenous compound (C) is small, it cannot impart sufficient thermal stability to the polyacetal resin (A), which may cause the generation of formaldehyde by decomposition of the resin when processing, the generation of mold deposits when molding, and the degradation of the mechanical properties of the resin composition and the degradation of the sliding characteristics consequent upon foaming, and the like, and therefore is unfavorable. On the other hand, if the blended amount of the nitrogenous compound (C) is excessive, this may be a factor inducing color changes or degradation of the mechanical properties or the like of the obtained resin composition, and therefore is unfavorable.

Graft Copolymer (D)

The graft copolymer (D) of the present invention has an olefin-based polymer (d1) as the main chain, and comprises a vinyl-based polymer (d2) as a side chain.

As the olefin-based polymer (d1) constituting the main chain component of the graft copolymer (D), homopolymers such as polyethylene, polypropylene, polybutene and the like, and copolymers having these as the main components may be mentioned. As a copolymer, ethylene•propylene copolymer, ethylene•1-butene copolymer, and a copolymer consisting of ethylene and an α•β-unsaturated glycidyl ester (for example, acrylic acid glycidyl ester, methacrylic acid glycidyl ester, ethacrylic acid glycidyl ester, and the like) and the like may be mentioned. Among these, polyethylene can be most preferably used.

The polymer which is graft copolymerized with this olefin-based polymer (d1) is the vinyl-based polymer (d2), and for example, poly methyl methacrylate, poly ethyl acrylate, poly butyl acrylate, poly 2-ethylhexyl acrylate, polystyrene, polyacrylonitrile, acrylonitrile-styrene copolymer, a copolymer of butyl acrylate and methyl methacrylate, and a copolymer of butyl acrylate and styrene, and the like may be mentioned.

Among these, the graft copolymer (D) is preferably a graft copolymer of an olefin-based polymer (d1) consisting of polyethylene, and a vinyl-based polymer (d2) consisting of an acrylonitrile-styrene copolymer or polystyrene, namely, the graft copolymer (D) is particularly preferably one comprising acrylonitrile-styrene-graft-polyethylene resin.

The preparation method of the graft copolymer is not particularly limited, but it may be easily prepared by a well known radical reaction. For example, the graft copolymer (D) may be prepared by a method of adding a radical catalyst to a monomer constituting the component (d1) and the monomer constituting the component (d2), kneading and grafting, or a method of adding a radical catalyst such as a peroxide or the like to either of the component (d1) or the component (d2) and generating a free radical, and melt kneading and grafting this with a polymer of the other component, and the like.

The proportion of the olefin-based polymer (d1) and the vinyl-based polymer (d2) constituting the graft copolymer (D) is preferably d1:d2=80:20 to 20:80 (weight ratio), and d1:d2=60:40 to 40:60 is particularly preferable.

Moreover, even in the case where the polyacetal resin composition comprises a copolymer having an olefin-based polymer (d1) as the main chain, and comprising a vinyl-based polymer (d2) as the side chain, if the copolymer is not a graft copolymer, in a sliding member, detachment may arise in the vicinity of a gate, and therefore this is unfavorable.

In the present invention, the blended amount of the graft copolymer (D) is 0.1 parts by weight to 1 part by weight with respect to 100 parts by weight of the polyacetal resin (A). If the blended amount of the graft copolymer (D) is small, the creaking sound improvement effect may be insufficient, therefore this is unfavorable. On the other hand, if the blended amount of the graft copolymer (D) is excessive, this may inhibit the mechanical properties such as the rigidity and the like, and therefore this is unfavorable.

Fatty Acid Ester (E) and Silicone Oil (F)

The polyacetal resin composition of the present invention comprises both a fatty acid ester (E) and a silicone oil (F) as lubricants.

Generally, as lubricants, a great diversity is known, such as mineral oils such as spindle oil, refrigerating machine oil, turbine oil, machine oil, cylinder oil, gear oil, paraffin-based oils, and the like; hydrocarbons such as fluid paraffin, paraffin wax, polyethylene wax, and the like; fatty acids such as lauric acid, myristic acid, palmitic acid, stearic acid, arachidic acid, behenic acid, montanic acid, and the like;

alcohols such as hexyl alcohol, octyl alcohol, cetyl alcohol, stearyl alcohol, behenyl alcohol, glycols, glycerin, polyglycerol, pentaerythritol, and the like; and fatty acid esters formed from fatty acids and alcohols such as stearyl stearate, behenyl behenate, pentaerythritol tristearate, pentaerythritol tetrastearate, glycerin monostearate, glycerin monobehenate, and the like; fatty acid amides such as stearyl amide, palmityl amide, oleyl amide, methylene bis stearamide, ethylene bis stearamide, and the like; metallic soaps such as calcium stearate, zinc stearate, magnesium stearate, and the like; natural waxes such as montan wax; various silicone oils, and the like. However, in the present invention the combined use of a fatty acid ester (E) and a silicone oil (F) is a requirement, whereby it is possible to obtain the effect of notably suppressing creaking sounds when sliding, which could not have been expected from other lubricants.

Fatty Acid Ester (E)

The fatty acid ester (E) used in the present invention is constituted comprising a fatty acid with a carbon number of 12 to 32, and a monohydric or polyhydric alcohol with a carbon number of 2 to 30.

As the fatty acid constituting the fatty acid ester (E), saturated fatty acids such as lauric acid, myristic acid, palmitic acid, stearic acid, behenic acid, lignoceric acid, cerotic acid, montanic acid, melissic acid and the like; or unsaturated fatty acids such as oleic acid, elaidic acid, linoleic acid, linolenic acid, arachidonic acid, erucic acid, ricinoleic acid and the like; and the like may be mentioned.

As the monohydric alcohol constituting the fatty acid ester (E), ethanol, propanol, butanol, pentanol, lauryl alcohol, stearyl alcohol, and the like are known. As the polyhydric alcohol constituting the fatty acid ester (E), ethylene glycol, propylene glycol, butanediol, glycerin, pentaerythritol, sorbitan, and the like are known. As specific examples of the fatty acid ester (E), stearyl stearate, ethylene glycol monostearate, glycerin monostearate, glycerin distearate, glycerin tristearate, sorbitan monostearate, sorbitan distearate, sorbitan monobehenate, pentaerythritol tetrastearate, and the like may be mentioned.

In the present invention, the blended amount of the fatty acid ester (E) is 0.1 parts by weight to 1 part by weight with respect to 100 parts by weight of the polyacetal resin (A). If the blended amount of the fatty acid ester (E) is small, in the case that the mating member is a metal, the frictional abrasion characteristics may be insufficiently obtained, and therefore this is unfavorable. On the other hand, if the blended amount of the fatty acid ester (E) is excessive, in a sliding member, detachment may arise in the vicinity of a gate, and therefore this is unfavorable.

Silicone Oil (F)

The type of the silicone oil (F) is not particularly limited, and as one example, the polydimethylsiloxane, polymethylphenylsiloxane shown by the structure in the below Formula (1), and the like may be mentioned.

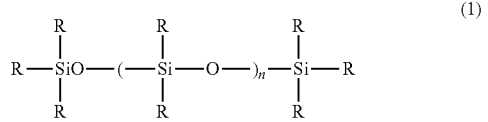

(1)

In Formula (1), R is basically a methyl group, but may also partially be an alkyl group, phenyl group, halogenated alkyl group, halogenated phenyl group, and the like.

The kinematic viscosity of the silicone oil (F) used in the present invention is not particularly limited, but in order to obtain a greater creaking sound improvement effect, the kinematic viscosity at 25° C. is preferably 5,000 cSt (50 cm$^2$/s) or more, more preferably 20,000 cSt (200 cm$^2$/s) or more, and even preferably 50,000 cSt (500 cm$^2$/s) or more.

The upper limit of the kinematic viscosity is not particularly limited, but in consideration of the dispersibility of the oil in the resin and the workability during melt kneading and molding treatment, the kinematic viscosity at 25° C. is preferably 100,000 cSt (1000 cm$^2$/s) or less. Further, in the present invention, it is possible to blend and use two or more silicone oils with differing structures or viscosities, and it is also possible to add a thickener, solvent or the like to the silicone oil for use in adjusting the viscosity or the like.

In the present invention, the blended amount of the silicone oil (F) is 0.5 parts by weight to 5 parts by weight with respect to 100 parts by weight of the polyacetal resin (A). If the blended amount of the silicone oil (F) is small, the creaking sound improvement effect, which is an objective of the present invention, may be insufficient, and therefore this is unfavorable. In addition, if the mating member is a resin molded article, this is also unfavorable in the point of insufficient frictional abrasion characteristics. On the other hand, if the blended amount of the silicone oil (F) is excessive, in a sliding member, detachment may arise in the vicinity of a gate, and therefore this is unfavorable.

Calcium Carbonate (G)

The polyacetal resin composition of the present invention comprises calcium carbonate (G). In order to improve the surface hardness and cutting processing properties, it is known to blend an inorganic powder with a polyacetal resin. As the inorganic powder, besides calcium carbonate, magnesium carbonate, talc, silica, clay, kaolin, diatomaceous earth, pearlite, bentonite, feldspar, carbon, white carbon and the like are known, but in consideration of hardness and sliding properties as a sliding member with the mating member, in the present invention calcium carbonate is adopted as the inorganic powder.

The average particle diameter of the calcium carbonate (G) is 1 μm or less, preferably 500 nm or less, and more preferably 200 nm or less. If the (G) average particle diameter is too large, the surface of the molded article will have irregularities, which causes an increase in the surface roughness, which is unfavorable in the point that it may damage the sliding mating member. Further, in the present specification, the particle diameter is the arithmetic mean value of the long diameter and the short diameter when measuring the long diameter and short diameter of a subject particle, observed with a magnification of 30,000 times using a S3000H scanning electron microscope manufactured by Hitachi High-Tech Solutions Corporation. Further, in the present specification, the average particle diameter is the arithmetic mean value of the particle diameters of 100 samples.

The lower limit of the average particle diameter is not particularly limited, but in order to prevent secondary agglomeration of the polyacetal resin composition, the average particle diameter of the calcium carbonate (G) is preferably 50 nm or more.

In the present invention, the blending amount of the calcium carbonate having an average particle diameter of 1

µm or less is 0.1 parts by weight to 1 part by weight with respect to 100 parts by weight of the polyacetal resin (A). If the blending amount of the calcium carbonate having an average particle diameter of 1 µm or less is small, the creaking sound improvement effect, which is an objective of the present invention, may be insufficient, and therefore this is not preferable. In addition, this is also unfavorable in the point that the frictional abrasion characteristics are insufficient in the case that the mating member is metal. On the other hand, if the blended amount of the calcium carbonate having an average particle diameter of 1 µm or less is excessive, the tensile properties (especially the toughness) of the sliding member may be insufficient, and therefore this is unfavorable. Further, the surface of the molded article will have irregularities, which causes an increase in the surface roughness, which is unfavorable in the point that it may damage the sliding mating member.

Other Components

The polyacetal resin composition may also comprise other components as necessary. For example, as a stabilizer, one or two or more of a hydroxide, an inorganic salt, or a carboxylate of an alkali or alkaline earth metal, or the like may be mentioned. Further, as long as it does not interfere with the objective•effects of the present invention, it is possible to add as required, one or more common additives for thermoplastic resins, for example, a colorant such as a dye, a pigment or the like, a lubricant, a mold release agent, an antistatic agent, a surfactant, or a filler such as an organic polymer, or an inorganic or organic fibrous, particulate or plate-shaped filler.

Preparation of the Polyacetal Resin Composition

For the preparation of the polyacetal resin composition according to the present invention, it may be easily prepared by a well-known method typically used as a conventional resin composition preparation method. For example, (1) a method of blending all of the components constituting the composition, feeding this to an extruder and melt kneading to obtain the composition in the form of pellets, (2) a method of feeding a part of the components constituting the composition from a main feed port of an extruder, feeding the remaining components from a side feed port, and melt kneading to obtain the composition in the form of pellets, (3) a method of preparing pellets of differing provisional compositions by extrusion or the like, and blending these pellets to adjust to a predetermined composition, or the like may be adopted.

Sliding Member

The sliding member according to the present invention is constituted comprising a resin molded article comprising the above described polyacetal resin composition. This sliding member has favorable performance not only for creaking sounds, but also for various other characteristics (tensile strength, toughness, flexural strength, rigidity, friction•abrasion characteristics, surface detachment, and the like), and therefore, can be suitably used for various sliding components in the AV and OA fields, and the measurement instrument field.

EXAMPLES

Below, the present invention is specifically explained by examples, but the present invention is not limited by these examples.

Examples and Comparative Examples

TABLE 1

| | | Example | | | | |
|---|---|---|---|---|---|---|
| | | 1 | 2 | 3 | 4 | 5 |
| A | polyacetal resin (MI = 27 g/10 min) | 100 | 100 | 100 | 100 | 100 |
| B | hindered phenolic antioxidant | 0.3 | 0.3 | 0.3 | 0.3 | 0.3 |
| C | melamine | 0.1 | 0.1 | 0.1 | 0.1 | 0.1 |
| D | PE-g-AS resin | 0.5 | 0.5 | 0.5 | 0.5 | 0.5 |
| D' | polyethylene resin | | | | | |
| E | glycerin monostearate | 0.5 | | | | |
| | glycerin tristearate | | 0.5 | | | |
| | glycerin monobehenate | | | 0.5 | | |
| | pentaerythritol tetrastearate | | | | 0.5 | |
| | stearyl stearate | | | | | 0.5 |
| F | silicone oil (60000 cSt) | 2 | 2 | | 2 | 2 |
| | silicone oil (5000 cSt) | | | 2 | | |
| G | calcium carbonate (average particle diameter: 150 nm) | 0.5 | 0.5 | 0.5 | 0.5 | 0.5 |
| | calcium carbonate (average particle diameter: 3.6 µm) | | | | | |

(Units are parts by weight.)

TABLE 2

| | | Comparative Example | | | | | | | | | |
|---|---|---|---|---|---|---|---|---|---|---|---|
| | | 1 | 2 | 3 | 4 | 5 | 6 | 7 | 8 | 9 | 10 |
| A | polyacetal resin (MI = 27 g/10 min) | 100 | 100 | 100 | 100 | 100 | 100 | 100 | 100 | 100 | 100 |
| B | hindered phenolic antioxidant | 0.3 | 0.3 | 0.3 | 0.3 | 0.3 | 0.3 | 0.3 | 0.3 | 0.3 | 0.3 |
| C | melamine | 0.1 | 0.1 | 0.1 | 0.1 | 0.1 | 0.1 | 0.1 | 0.1 | 0.1 | 0.1 |
| D | PE-g-AS resin | | 5 | | 0.5 | 0.5 | 0.5 | 0.5 | 0.5 | 0.5 | 0.5 |
| D' | polyethylene resin | | | 0.5 | | | | | | | |
| E | glycerin monostearate | 0.5 | 0.5 | 0.5 | | 5 | 0.5 | 0.5 | 0.5 | 0.5 | 0.5 |
| | glycerin tristearate | | | | | | | | | | |
| | glycerin monobehenate | | | | | | | | | | |
| | pentaerythritol tetrastearate | | | | | | | | | | |
| | stearyl stearate | | | | | | | | | | |
| F | silicone oil (60000 cSt) | 2 | 2 | 2 | 2 | 2 | | 10 | 2 | 2 | 2 |
| | silicone oil (5000 cSt) | | | | | | | | | | |

TABLE 2-continued

|   |   | Comparative Example | | | | | | | | | |
|---|---|---|---|---|---|---|---|---|---|---|---|
|   |   | 1 | 2 | 3 | 4 | 5 | 6 | 7 | 8 | 9 | 10 |
| G | calcium carbonate (average particle diameter: 150 nm) | 0.5 | 0.5 | 0.5 | 0.5 | 0.5 | 0.5 | 0.5 |   | 5 |   |
|   | calcium carbonate (average particle diameter: 3.6 μm) |   |   |   |   |   |   |   |   |   | 0.5 |

(Units are parts by weight.)

Each of the components in Table 1 and Table 2 is as follows.

Polyacetal resin (A)

A polyacetal copolymer (melt index (measured at 190° C., load 2160 g): 27 g/10 min) made by copolymerizing 96.7 weight % trioxane and 3.3 weight % 1,3-dioxolane.

Hindered phenolic antioxidant (B)

Product name: Irganox 245, triethylene glycol-bis[3-(3-t-butyl-5-methyl-4-hydroxyphenyl)propionate], manufactured by BASF.

Nitrogenous compound (C): melamine.

Graft copolymer (D) having an olefin-based polymer (d1) as the main chain, and comprising a vinyl-based polymer (d2) as a side chain.

Product name: Modiper (registered trademark) A1401, a graft copolymer made by copolymerizing polyethylene and acrylonitrile•styrene (PE-g-AS), manufactured by NOF Corporation.

Polyethylene resin (D')

Product name: Hi-Zex 6203B, polyethylene resin wth a melt index of 0.36 g/10 min, manufactured by Prime Polymer Co., Ltd.

Fatty acid ester (E)
glycerin monostearate
glycerin tristearate
glycerin monobehenate
pentaerythritol tetrastearate
stearyl stearate Silicone oil (F)

Product name: SH200-60000CS, a silicone oil with a kinematic viscosity of 60,000 cSt (600 cm$^2$/s) at 25° C., manufactured by Dow Corning Toray Co., Ltd.

Product name: SH200-5000CS, a silicone oil with a kinematic viscosity of 5,000 cSt (50 cm$^2$/s) at 25° C., manufactured by Dow Corning Toray Co., Ltd.

Calcium carbonate (G) with an average particle diameter of 1 μm or less

Product name: Brilliant-1500, a calcium carbonate with an average particle diameter of 150 nm, manufactured by Shiraishi Calcium Kaisha, Ltd.

Calcium carbonate (G') with an average particle diameter exceeding 1 μm

Product name: Whiton B, a calcium carbonate with an average particle diameter of 3.6 μm, manufactured by Shiraishi Calcium Kaisha, Ltd.

Preparation of the Polyacetal Resin Composition

The components disclosed in Table 1 were blended in the proportions disclosed in Table 1, and by melt-kneading in a twin screw extruder at 210° C., the polyacetal resin compositions in pellet form of the Examples and Comparative Examples were obtained.

Evaluation

In order to evaluate the polyacetal resin compositions in pellet form of the Examples and Comparative Examples, the tensile properties, flexural properties, frictional abrasion characteristics, creaking sounds, and appearance of the molded articles were evaluated.

Tensile Properties (Tensile Strength, Tensile Elongation)

Using an injection molding apparatus (SE100DU manufactured by Sumitomo Heavy Industries, Ltd.), with the conditions of cylinder temperature: 205° C., and die temperature: 90° C., ISO 1A type test pieces were injection molded from the pellets of the Examples and Comparative Examples. After this, the tensile properties of the test pieces were measured in conformity with ISO 527-1 and 2. The results are shown in Table 3 and Table 4.

Flexural Strength, Flexural Modulus of Elasticity

Using the above described injection molding apparatus, with the conditions of cylinder temperature: 205° C., and die temperature: 90° C., test pieces (4 mm×10 mm×80 mm) were injection molded from the pellets of the Examples and Comparative Examples. After this, the flexural properties of the test pieces were measured in conformity with ISO 178. The results are shown in Table 3 and Table 4.

Frictional Abrasion Characteristics

Using the above described injection molding apparatus, with the conditions of cylinder temperature: 200° C., and die temperature: 80° C., cylindrically shaped test pieces with an outer diameter of 25.6 mm and an inner diameter of 20 mm were injection molded from the pellets of the Examples and Comparative Examples. Then, using two types of test piece as the mating member, the coefficient of dynamic friction, and the relative abrasion loss were measured according to the Suzuki type frictional abrasion test. One type of the two types of test piece was a polyacetal resin molded article (product name: Duracon (registered trademark) M90-44, manufactured by Polyplastics Co., Ltd.), and the other type was carbon steel S55C. The measurement conditions for the case that the mating member was a polyacetal resin molded article, were surface pressure: 0.06 MPa, speed: 15 cm/s, and for the case that the mating member was carbon steel, surface pressure: 0.98 MPa, speed 30 cm/s. The results are shown in Table 3 and Table 4.

Creaking Sounds

For cylindrically shaped test pieces which are the same as the cylindrically shaped test pieces obtained in the above "[Frictional Abrasion Characteristics]", when measuring according to the Suzuki type frictional abrasion test with speed: 10 cm/s, and the upper and lower polyacetal resin molded articles consisting of the same material, while sliding under these conditions, the surface pressure was increased in steps, and the surface pressure where a sound of 70 dB or more was generated at a distance of 5 cm from the sliding face of the test piece and the mating member was measured. The results are shown in Table 3 and Table 4.

External Appearance of the Molded Article

Using the above described injection molding apparatus, with the conditions of cylinder temperature: 200° C., and die temperature: 80° C., 80 mm×80 mm×1 mm (side gate 2 mm×1 mm) test pieces were injection molded at two injection speeds. One injection speed was 10 m/min (high speed) and the other injection speed was 1 m/min (low speed).

For the high speed injection molded test piece, the detachment in the vicinity of the gate was visually observed. When no detachment was noted this was evaluated as "0"; when slight detachment was noted this was evaluated as "1"; when much detachment was noted this was evaluated as "2", when very much detachment was noted this was evaluated as "3". The results are shown in Table 3 and Table 4.

For the low speed injection molded test piece, the external appearance of pock marks was visually observed. When no pock marks were noted this was evaluated as "0"; when few pock marks were noted this was evaluated as "1"; when many pock marks were noted this was evaluated as "2", and when very many pock marks were noted this was evaluated as "3". The results are shown in Table 3 and Table 4.

TABLE 3

| | Example | | | | |
|---|---|---|---|---|---|
| | 1 | 2 | 3 | 4 | 5 |
| tensile strength(MPa) | 52 | 51 | 52 | 53 | 50 |
| tensile elongation(%) | 57 | 45 | 58 | 55 | 61 |
| flexural strength(MPa) | 76 | 76 | 75 | 76 | 71 |
| flexural modulus of elasticity(MPa) | 2330 | 2340 | 2300 | 2340 | 2260 |
| frictional abrasion[with respect to POM resin] | | | | | |
| relative abrasion loss[self] ($\times 10^{-3}$ mm$^3$/(N · km)) | 1.0 | 1.2 | 0.9 | 0.9 | 0.8 |
| relative abrasion loss [mating member] ($\times 10^{-3}$ mm$^3$/(N · km)) | 4.9 | 5.3 | 4.7 | 4.6 | 4.1 |
| coefficient of dynamic friction | 0.19 | 0.20 | 0.19 | 0.18 | 0.17 |
| frictional abrasion [with respect to metal] | | | | | |
| relative abrasion loss[self] ($\times 10^{-3}$ mm$^3$/(N · km)) | 0.21 | 0.30 | 0.22 | 0.27 | 0.19 |
| coefficient of dynamic friction | 0.18 | 0.20 | 0.18 | 0.19 | 0.17 |
| creaking sound (MPa) | 7 | 7 | 5 | 7 | 7 |
| external appearance [detachment] | 0 | 0 | 0 | 0 | 0 |
| external appearance [pock marks] | 0 | 0 | 0 | 0 | 0 |

TABLE 4

| | Comparative Example | | | | | | | | | |
|---|---|---|---|---|---|---|---|---|---|---|
| | 1 | 2 | 3 | 4 | 5 | 6 | 7 | 8 | 9 | 10 |
| tensile trength (MPa) | 57 | 49 | 50 | 53 | 46 | 56 | 46 | 52 | 56 | 51 |
| tensile longation (%) | 65 | 22 | 36 | 55 | 50 | 36 | 53 | 59 | 17 | 43 |
| flexural strength (MPa) | 80 | 70 | 71 | 77 | 67 | 81 | 65 | 75 | 79 | 75 |
| flexural modulus of elasticity(MPa) | 2410 | 2000 | 2290 | 2360 | 2180 | 2430 | 2150 | 2320 | 2400 | 2340 |
| frictional abrasion [with respect to POM resin] | | | | | | | | | | |
| relative abrasion loss [self] ($\times 10^{-3}$mm$^3$/(N · km)) | 1.4 | 4.0 | 1.8 | 13 | 1.4 | 18 | 13 | 1.0 | 0.8 | 0.9 |
| relative abrasion loss [mating member] ($\times 10$-3 mm$^3$/(N · km)) | 6.2 | 8.3 | 4.9 | 28 | 5.2 | 32 | 18 | 4.3 | 3.8 | 5.1 |
| coefficient of dynamic friction | 0.21 | 0.23 | 0.20 | 0.33 | 0.20 | 0.32 | 0.28 | 0.19 | 0.18 | 0.20 |
| frictional abrasion [with respect to metal] | | | | | | | | | | |
| relative abrasion loss [self] ($\times 10^{-3}$mm$^3$/(N · km)) | 0.24 | 0.20 | 0.41 | 0.44 | 0.36 | 1.0 | 1.3 | 0.82 | 2.9 | 0.25 |
| coefficient of dynamic friction | 0.19 | 0.16 | 0.21 | 0.28 | 0.15 | 0.30 | 0.19 | 0.21 | 0.35 | 0.19 |
| creaking sound (MPa) | 2 | 6 | 5 | 3 | 7 | 1 | 8 | 2 | 7 | 7 |

TABLE 4-continued

| | Comparative Example | | | | | | | | | |
|---|---|---|---|---|---|---|---|---|---|---|
| | 1 | 2 | 3 | 4 | 5 | 6 | 7 | 8 | 9 | 10 |
| external appearance [detachment] | 1 | 1 | 2 | 0 | 3 | 0 | 3 | 1 | 0 | 0 |
| external appearance [pock marks] | 0 | 2 | 0 | 0 | 1 | 0 | 1 | 0 | 3 | 2 |

When using the polyacetal resin composition according to the Examples, favorable results for not only creaking sounds, but also for various other characteristics (tensile strength, toughness, flexural strength, rigidity, friction·abrasion characteristics, surface detachment, and the like) are shown. Further, a kinematic viscosity of the silicone oil (F) at 25° C. of 5,000 cSt (50 cm$^2$/s) or more is sufficient (Example 3), but if the kinematic viscosity at 25° C. is 50,000 cSt (500 cm$^2$/s) or more, even more remarkable creaking sound improvement effects are shown (Examples 1, 2, 4, and 5).

On the other hand, it was confirmed that when the graft copolymer (D) was not included, the creaking sound improvement effect cannot be said to be sufficient (Comparative Example 1). Further, it was confirmed that when the blended amount of the graft copolymer (D) was excessive, the mechanical properties such as the rigidity and the like may be inhibited (Comparative Example 2). Moreover, it was confirmed that also for the case of a polyethylene resin, for a sliding member, detachment in the vicinity of a gate may occur (Comparative Example 3).

Further, it was confirmed that when the fatty acid ester (E) was not included, the frictional abrasion characteristics when the mating member was metal may be insufficient (Comparative Example 4). Further, it was confirmed that when the blended amount of the graft copolymer (D) was excessive, for the sliding member, detachment in the vicinity of the gate may occur (Comparative Example 5).

Further, it was confirmed that when the silicone oil (F) was not included, the creaking sound improvement effect, which is an objective of the present invention, may be insufficient (Comparative Example 6). In addition, it was confirmed that when the mating member was a resin molded article, the frictional abrasion characteristics may be insufficiently obtained (Comparative Example 6). On the other hand, it was confirmed that when the blended amount of the silicone oil (F) was excessive, for the sliding member, detachment may occur in the vicinity of the gate (Comparative Example 7).

Further, it was confirmed that when the calcium carbonate (G) with an average particle diameter of 1 μm or less was not included, the creaking sound improvement effect, which is an objective of the present invention, may be insufficient (Comparative Example 8). In addition, it was confirmed that when the mating member is a resin molded article, the frictional abrasion characteristics may be insufficient (Comparative Example 8). On the other hand, it was confirmed that when the blended amount of the calcium carbonate (G) with an average particle diameter of 1 μm or less was excessive, the tensile properties of the sliding member (in particular the toughness) may be insufficient (Comparative Example 9). Further, it was confirmed that the molded article's surface has irregularities, which cause an increase in the surface roughness, and may damage the sliding mating member (Comparative Example 9). Further, it was confirmed that even if the polyacetal resin composition comprises a calcium carbonate powder, if the average particle diameter exceeds 1 μm, the molded article's surface has irregularities, which cause an increase in the surface roughness, and may damage the sliding mating member (Comparative Example 10).

The invention claimed is:

1. A polyacetal resin composition, comprising 100 parts by weight of a polyacetal resin (A),
    0.01 parts by weight to 1 part by weight of a hindered phenolic antioxidant (B),
    0.01 parts by weight to 1 part by weight of a nitrogenous compound (C),
    0.1 parts by weight to 1 part by weight of a graft copolymer (D),
    0.1 parts by weight to 1 part by weight of a fatty acid ester (E),
    0.5 parts by weight to 5 parts by weight of a silicone oil (F), and
    0.1 parts by weight to 1 part by weight of calcium carbonate (G), wherein
    the nitrogenous compound (C) is at least one selected from the group consisting of an aminotriazine compound, a guanamine compound, a hydrazide compound, and a polyamide compound,
    the graft copolymer (D) has an olefin-based polymer (d1) as a main chain, and comprises a vinyl-based polymer (d2) as a side chain,
    the fatty acid ester (E) is constituted from a fatty acid with a carbon number of 12 to 32, and a monohydric or polyhydric alcohol with a carbon number of 2 to 30, and the calcium carbonate (G) has an average particle diameter of 1 μm or less.

2. A polyacetal resin composition according to claim 1, wherein the graft copolymer (D) comprises an acrylonitrile-styrene-graft-polyethylene resin.

3. A polyacetal resin composition according to claim 1 or 2, wherein the silicone oil (F) has a kinematic viscosity at 25° C. of 50,000 cSt (500 cm$^2$/s) or more.

4. A sliding member constituted from a resin molded article comprising the polyacetal resin composition according to claim 1 or 2.

* * * * *

UNITED STATES PATENT AND TRADEMARK OFFICE
CERTIFICATE OF CORRECTION

PATENT NO. : 9,969,875 B2  
APPLICATION NO. : 15/548994  
DATED : May 15, 2018  
INVENTOR(S) : Akihide Shimoda and Hirokazu Katsuchi Page 1 of 1

It is certified that error appears in the above-identified patent and that said Letters Patent is hereby corrected as shown below:

On the Title Page

Under (*) Column 1, Line 3, After "0 days." delete "days.".

In the Specification

Column 3, Line 25 (approx.), After "(G)" insert --.--.

Column 3, Line 48, "butylidinebis" should be --butylidenebis--.

Column 3, Line 54, "buthylphenyl)" should be --butylphenyl)--.

Column 11, Line 34, "wth" should be --with--.

Column 11, Line 51, After "less" insert --.--.

Column 11, Line 56, After "μm" insert --.--.

Signed and Sealed this  
Fourth Day of September, 2018

Andrei Iancu  
*Director of the United States Patent and Trademark Office*